May 15, 1956 — B. NAGLER — 2,745,498
ROCKET-DRIVEN HELICOPTER ROTOR
Filed Oct. 23, 1951 — 4 Sheets-Sheet 1
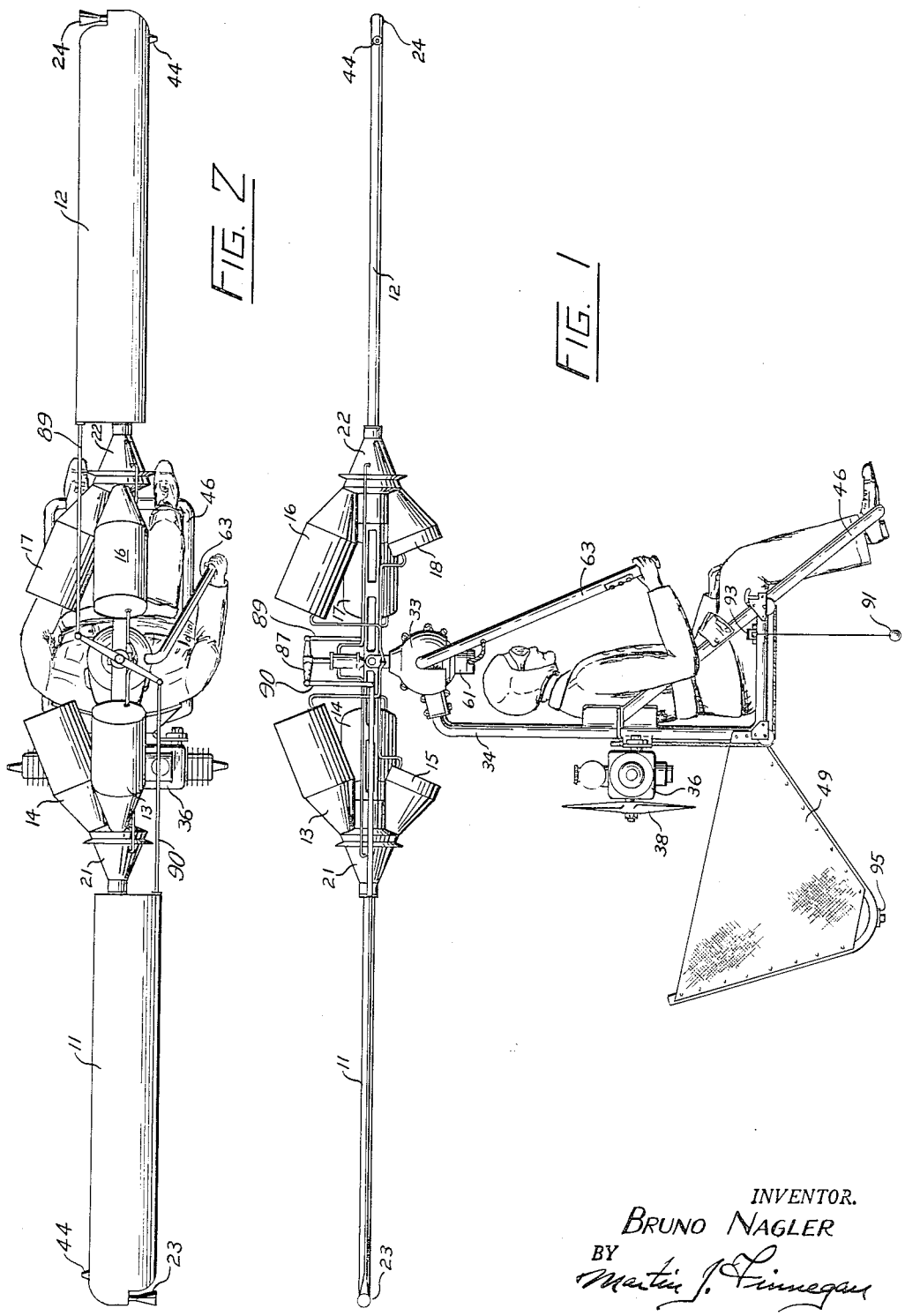
INVENTOR.
BRUNO NAGLER
BY Martin J. Finnegan
ATTORNEY May 15, 1956      B. NAGLER      2,745,498
ROCKET-DRIVEN HELICOPTER ROTOR
Filed Oct. 23, 1951      4 Sheets-Sheet 2

INVENTOR.
BRUNO NAGLER
BY
Martin J. Finnegan
ATTORNEY

May 15, 1956        B. NAGLER        2,745,498
ROCKET-DRIVEN HELICOPTER ROTOR
Filed Oct. 23, 1951        4 Sheets-Sheet 3
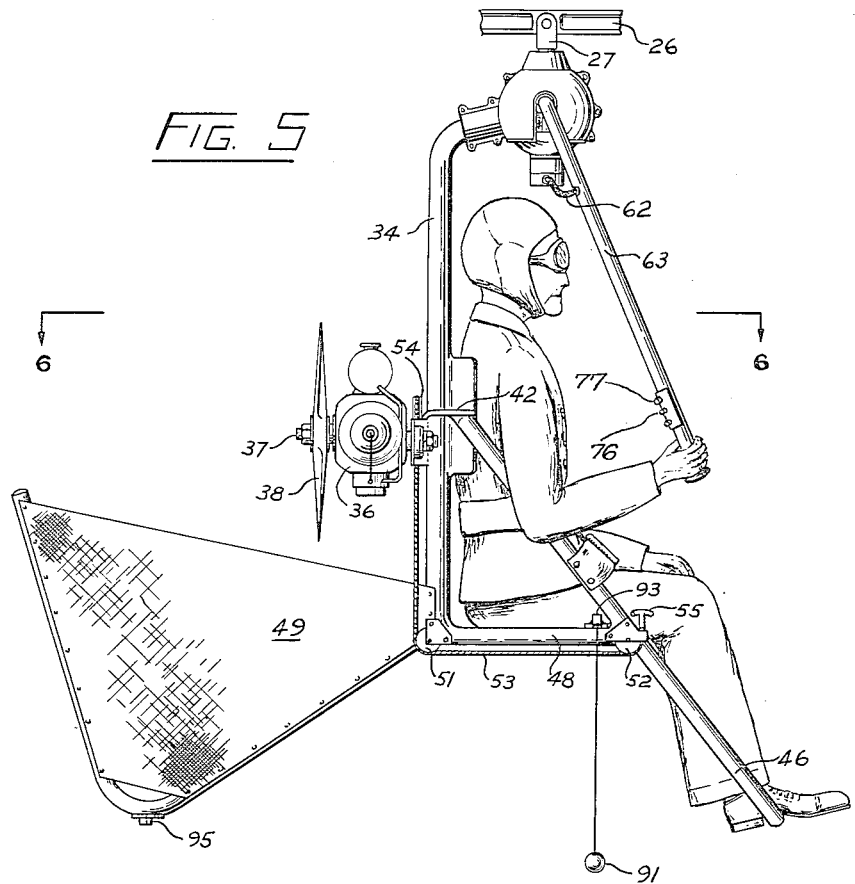
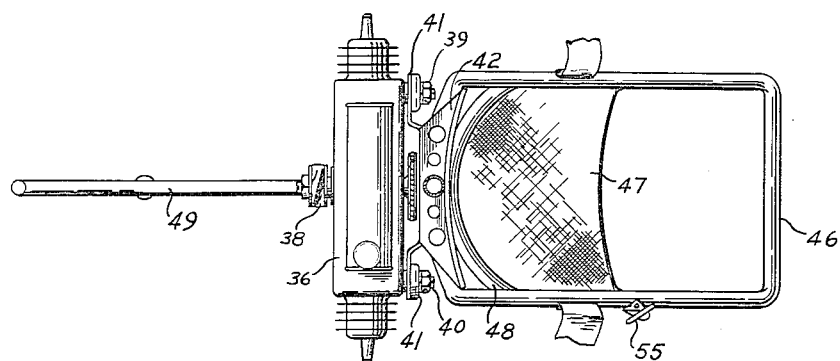
INVENTOR.
BRUNO NAGLER
BY
Martin J. Finnegan
ATTORNEY

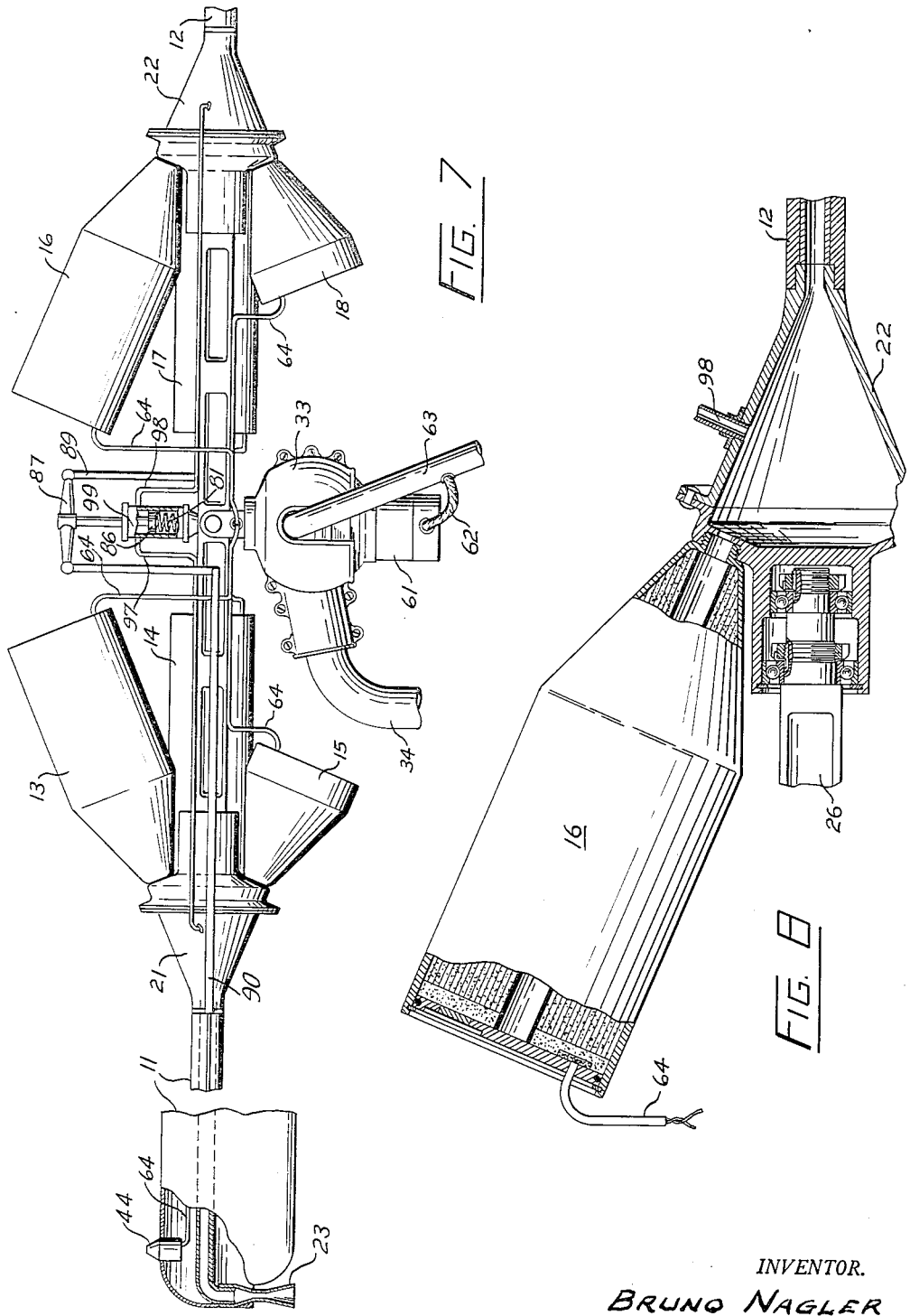

United States Patent Office 2,745,498
Patented May 15, 1956

2,745,498

ROCKET-DRIVEN HELICOPTER ROTOR

Bruno Nagler, Boston, Mass., assignor to Nagler Helicopter Company, Inc., a corporation of Delaware Application October 23, 1951, Serial No. 252,647

4 Claims. (Cl. 170—135.4)

This invention relates to aircraft, and particularly to aircraft embodying rotary wings.

In my application No. 234,711 filed July 2, 1951, now abandoned, I have disclosed and claimed a craft having rotatable wings or blades of aerofoil contour for direct vertical flight and subsequent return to earth along an oblique glide path; the rotation of the wings or blades being brought about by the discharge of fluid under pressure from the blade tips, and the pressure fluid being generated in power plants of the rocket type, mounted on the respective wings or blades, adjacent their points of connection with a central hub located at the common axis of rotation of said wings or blades. Such a craft will ascend vertically to the limit determined by the quantity of fuel in the rocket power plants, which fuel may be divided between a plurality of individual rockets, firing of which is under the control of the pilot. When the limit or vertical ascent is attained, the oblique descent begins. Accordingly, the total distance traversable by the craft, measured along the earth's surface, will be a direct function of the height attainable by use of the power derived from the combustion of the rocket fuel.

My present invention provides an aircraft of the rotary wing type having a plurality of airfoil blades arranged to rotate about a spindle journaled in a supporting rig. Each of the airfoil blades has a hollow manifold commencing at its inner end connected to a fluid discharge nozzle positioned at its outer end. Rocket motors are integrally mounted upon each of said blades at the inner end thereof and are connected to each of the manifolds so the pressurized fluid generated by the rocket motors will be transmitted to the discharge nozzles at the end of each blade where it is discharged to create the force which causes the blades to rotate. An automatic blade pitch control means responsive to the pressure in each of the manifolds is provided to automatically regulate the blade pitch so the rotating blades will produce maximum lift in relation to the power output of the rocket motors. Electrical means is provided extending through the spindle to deliver current to the rocket motors to ignite the rocket charges.

The invention will be understood upon reference to the following description of the embodiment of the invention illustrated in the accompanying drawings, wherein:

Fig. 1 is an elevation view of the invention as embodied in a flying machine having rotary wings journaled in a supporting rig adapted for suspension about the body of a person to be flown therein; the rig also carrying a power plant equipped with a vertically rotating propeller;

Fig. 2 is a plan view of the machine of Fig. 1;

Fig. 3 is a vertical sectional view of the upper portion of the supporting rig, including the spherical socket bearing, vertical spindle, wing-tilting and electrical current-directing mechanisms above referred to;

Fig. 4 is a vertical fragmentary sectional view along the lines 4—4 of Fig. 3;

Fig. 5 is a larger scale elevation view of the supporting rig, with the propeller-driving power plant attached;

Fig. 6 is a horizontal sectional view along line 6—6 of Fig. 5;

Fig. 7 is a vertical sectional view showing the rocket engines associated with each wing, or blade, and a portion of the mechanism for controlling the pitch of both blades; and Fig. 8 is a sectional view of one of the rocket engines (fluid pressure generating units) of Fig. 7 with the fluid receiving manifold and swivel mounting on the blade shank being also illustrated.

Figures 3, 4:
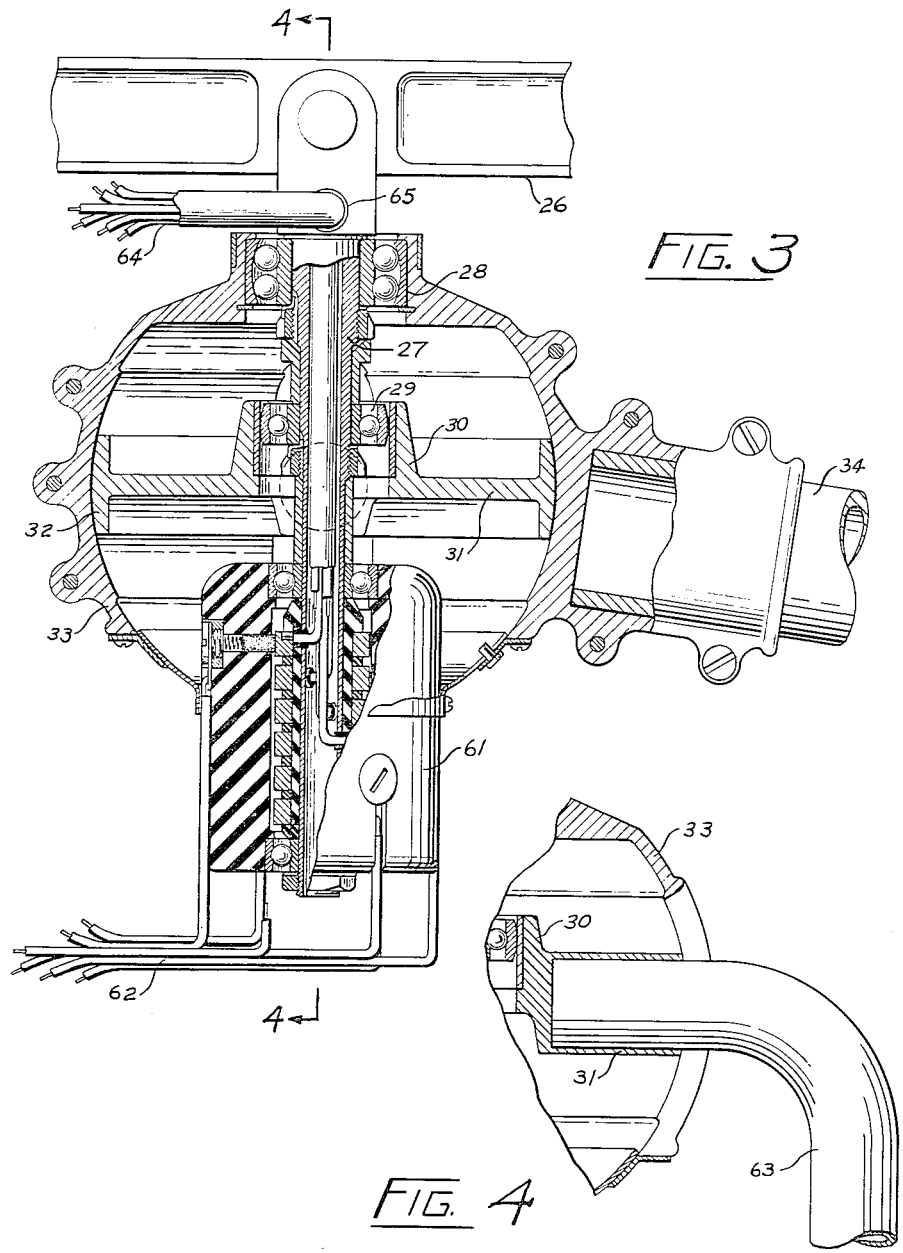

Referring first to Figs. 1, 2 and 7, there is illustrated therein a pair of hollow blades, or wings, 11, 12 of aerofoil cross-section, and a series of fluid pressure generating units (rocket motors) 13–18; the units 13, 14 and 15 being secured to the blade 11, and the units 16, 17 and 18 to the blade 12. Each of these rocket units is adapted to be ignited individually, by electrical means, and each is adapted to discharge its liberated gases into its associated manifold (21 or 22, as the case may be) which in turn directs the gases into the long tube extending through each blade, and terminating in the discharge jets 23, 24 at the tips of the respective blades.

The blades 11, 12 have shank portions 26 articulated with the bifurcated upper end of vertical spindle 27; the latter being rotatably supported in the bearing assemblies 28 and 29, the latter being carried by the tubular extension 30 of the ring 31 and the blade assembly, including the rotor spindle, being tiltable about the center of bearing assembly 28 in response to manual shifting of a steering rod 63. Ring 31 has a spherical-surfaced rim 32 fitting the inner surface of spherical socket bearing 33, which latter is mounted at the upper curved end of vertical column 34; said column 34 being the main element of the suspension rig. By tilting the ring 31 about its center which coincides with the center of the spherical socket bearing 33, the vertical spindle is caused to tilt about the center of bearing assembly 28.

The power plant 36, whose shaft 37 carries the propeller 38, is fitted with two brackets 39 and 40, adapted to receive the cross-bar 41 welded to saddle 42 of the suspension rig, the saddle being apertured to receive the column 34 at the point adjacent the point of attachment of cross-bar 41.

Also secured to saddle 42 (in such manner as to permit folding of the parts when not in use) are the ends of a U-shaped tube 46 adapted to serve as a leg rest for use by the pilot of the rig. A seat 47 is attached to a horizontally disposed curved element 48, into which the lower end of the vertical column 34 is fitted. A stabilizer panel 49 is attached to the column 34, to extend rearwardly, as shown; the rig being generally similar to that of my co-pending application, above identified. Body-retaining straps may, of course, be attached wherever desired. Pulleys 51, 52, guide a cable 53 that is wound about sheave 54 on the engine shaft 37. The pilot grasps handle 55, on the end of this cable, and exerts a sharp pull thereon for the purpose of starting the engine; the cable being spring-retracted, in the usual manner.

Figs. 7 and 8 illustrate in greater detail the rocket motors. As shown therein, these motors are disposed in angularly disposed relationship about the axis of blade shank 26, each motor being similar in construction to the solid propellant container illustrated at "25" in Miller patent, No. 2,447,200 granted August 17, 1948, and assigned to Aerojet Engineering Corporation of Azusa, California.

The motor units 15 and 18 are shorter than the other units, as they operate only as "cushion"-creating agencies, just prior to contact with the ground, on the gliding descent, in the manner explained more fully in my co-pending application, above identified.

Collector ring assembly 61, shown best in Fig. 3, corresponds generally to the collector ring unit of my co-pending application, above identified, and receives conductors 62 which are carried thereto by way of steering rod 63, as indicated, best in Fig. 7. The conductors 64 from the individual collector rings emerge from hollow spindle 27, through radial outlet 65, and lead to their respective rocket units 13 to 18, except that two of the conductors lead to the rocket units 44 on the respective blade tips; ignition of the latter rocket units being controlled by the automatic switch 95 which closes upon contact between stabilizer 49 and the ground, as the craft descends. The firing of these two blade-tip rockets causes the direction of force application to be reversed, thus bringing rotation of the blades to a prompt halt, once the craft has landed; the circuit connections from switch 95 to the rockets 44—also the connections to the rockets 15 to 18 from switch 93 (actuated by weight 91) and switches 76, 77 (actuated manually)—being as illustrated in "Fig. 7" of my co-pending application, above identified.

During the ascent of the rig, the tubes 97, 98 (Fig. 7) carry fluid under pressure into the cylinder 99, to depress the cross-bar 87. Depression of cross-bar 87 turns the rotating blade 11 downwardly (as viewed by Fig. 7) about the axis of shank 26, to vary its pitch to an angle that is best suited to vertical ascent, and likewise blade 12 (not shown in Fig. 7) will be correspondingly turned to its best pitch angle for ascent; the links 89 and 90 being involved to produce such turning. Following depletion of the fluid pressure supply, spring 81 will push piston 86 back to its upper position, thereby returning blades 11, 12 to the opposite pitch positions, the latter being best for the gliding descent of the rig. During such descent the rider steers the rig by leaning to the left or right, as desired, and applying corresponding pressure to the steering rod 63 to change the angle of inclination of the rotating blade assembly; the steering ring 31 being adapted to slide about the inner spherical surface of the bearing element 33 during such steering process.

What I claim is:

1. In an aircraft, a suspension rig, a set of horizontally disposed wings rotatable about said suspension rig, each of said wings having a hollow manifold at its inner end, and a fluid discharge jet at its outer end, a power plant integral with said wings and rotatable therewith, said power plant including a plurality of rocket motors carried on each of said manifolds, and means for causing said rocket motors to direct fluid under pressure into said manifolds, for passage along said wings, and discharge to the atmosphere by way of said fluid discharge jets.

2. In an aircraft, a supporting rig having a central bearing assembly, a spindle having its lower end rotatable within said bearing assembly, a pair of wings articulated with said spindle at its upper end, each of said wings having inner, central, and outer sections, said central sections comprising fluid manifolds having opposite end portions for coupling attachment to the inner and outer sections, respectively, of said wings, and a plurality of rocket motors attached to each of said manifolds.

3. An aircraft as defined in claim 2, including means extending through said spindle for delivering igniting current to said rocket motors.

4. In a rotating wing aircraft having a plurality of airfoil blades arranged to rotate about a central axis, each of said blades having a hollow manifold at its inner end and a fluid discharge nozzle at its outer end, rocket motors rotatable with each blade and attached to each of said manifolds, an automatic blade pitch control means responsive to the pressure in said manifolds arranged to produce maximum pitch in the rotating blades in relation to the power output of the rocket motors.

References Cited in the file of this patent

UNITED STATES PATENTS

| | | |
|---|---|---|
| 1,099,083 | Duc | June 2, 1914 |
| 2,261,337 | Campbell | Nov. 4, 1941 |
| 2,330,056 | Howard | Sept. 21, 1943 |
| 2,491,042 | Hayot | Dec. 13, 1949 |

FOREIGN PATENTS

| | | |
|---|---|---|
| 1,002,007 | France | Oct. 31, 1951 |